United States Patent
Doganata et al.

(10) Patent No.: US 9,575,947 B2
(45) Date of Patent: *Feb. 21, 2017

(54) SYSTEM AND METHOD OF AUTOMATICALLY MAPPING A GIVEN ANNOTATOR TO AN AGGREGATE OF GIVEN ANNOTATORS

(71) Applicant: INTERNATIONAL BUSINESS MACHINES CORPORATION, Armonk, NY (US)

(72) Inventors: Yurdaer N. Doganata, Chestnut Ridge, NY (US); Genady Grabarnik, Scarsdale, NY (US); Lev Kozakov, Stamford, CT (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 937 days.

This patent is subject to a terminal disclaimer.

(21) Appl. No.: 13/668,876

(22) Filed: Nov. 5, 2012

(65) Prior Publication Data

US 2013/0067311 A1    Mar. 14, 2013

Related U.S. Application Data

(63) Continuation of application No. 11/620,159, filed on Jan. 5, 2007, now Pat. No. 8,356,245.

(51) Int. Cl.
G06F 17/00 (2006.01)
G06F 17/28 (2006.01)
G06F 17/24 (2006.01)

(52) U.S. Cl.
CPC ........... *G06F 17/241* (2013.01); *G06F 17/289* (2013.01)

(58) Field of Classification Search
CPC .......................... G06F 17/241; G06F 17/289
See application file for complete search history.

(56) References Cited

U.S. PATENT DOCUMENTS

| 6,397,181 B1 | 5/2002 | Li et al. |
| 2004/0078190 A1 | 4/2004 | Fass et al. |
| 2005/0027664 A1 | 2/2005 | Johnson et al. |

*Primary Examiner* — Farzad Kazeminezhad
(74) *Attorney, Agent, or Firm* — Whitham, Curtis & Cook, PC; Daniel P. Morris (57) ABSTRACT

A document corpus is annotated by given annotators and aggregates of the given annotators to generate a corpus of pre-annotated documents with given annotations. The same document corpus is annotated by a subject annotator to have subject annotations. The subject annotations are decomposed into superpositions of the given annotations. The decomposed subject annotations are mapped to a most representative superposition of the given annotations. The subject annotator may be mapped to the aggregate of given annotators corresponding to the most representative superposition.

9 Claims, 4 Drawing Sheets

SYSTEM AND METHOD OF AUTOMATICALLY MAPPING A GIVEN ANNOTATOR TO AN AGGREGATE OF GIVEN ANNOTATORS

FIELD OF THE INVENTION

The field of the invention is data processing of documents, more specifically, mapping a given annotator to an aggregate of other annotators in a given knowledge domain.

BACKGROUND OF THE INVENTION

Text analysis, referenced hereinafter as "TA," is known in the art pertaining to this invention as a sub-area or component of Natural Language Processing, hereinafter referenced as "NLP." TA is used in a range of commercial, research and educational industries and uses including, for example, information search and retrieval systems, e-commerce and e-learning systems. A typical TA involves an "annotator" which, as known in the relevant art, is a process for searching and analyzing text documents using a defined set of tags, and running the annotator on the text document to generate what is known in the art as "linguistic annotations." Annotators and linguistic annotations are well known. For the interested reader, an example listing of the many available TA publications can be found at the following URL: <http://www.ldc.upenn.edu/>.

An example TA may be illustrated by: <annot type="X">text</annot>, where "X" may be any of a defined set of annotation types such as, for example, Person, Organization and Location, and "text" is the text that the "X" annotation characterizes. This example TA, when inserted into or otherwise associated with an example text to indicate or delineate the beginning and end of the annotated text, may be as follows:

"The underlying economic fundamentals remain sound as has been pointed out by the Fed," said <annot type="Person">Alan Gayle</annot>, a managing director of <annot type="Organization">Trusco Capital Management</annot> in <annot type="Location" kind="city">Atlanta</annot>, "though fourth-quarter growth may suffer".

In the above example, "Alan Gayle" is an instance of the annotation type Person, "Trusco Capital Management" is an instance of the annotation type Organization and "Atlanta" is an instance of the annotation type Location. The example annotation type Location has an example feature, shown as "kind," with example possible values of "city", "state", and the like.

A problem can exist or present, though, when using a new or unknown annotator, which is that the industrial fields or other TA objectives to which the unknown annotator relates, to which it may be best suited, may not be fully known.

These and other problems can be considerable, because a user often needs a particularly tailored application, e.g. particular annotation rules and annotation types (e.g. annotate all CEOs of IT companies), in documents from in a given document collection or domain. There are known ways of building such particularly tailored applications, such as, for example, Interactive Learning System (see, for instance, SAIL system—http://www.research.ibm.com/IE/). These related art systems can eventually generate a rule-based annotation engine, capable of producing desired annotations, but have at least two shortcomings: human judgment is required, and there is a possibility of producing or converging on an inefficient result. For example, there may be a high number of processing rules generated by the SAIL system in response to interactions with the human user. Further, a new knowledge domain, and even a new document corpus, may require re-training of the system and re-generating the rules.

SUMMARY OF THE INVENTION

It is therefore an object of the invention to provide a method and apparatus for mapping an annotator to a best aggregate of a collection's annotators.

Another object of the invention is to provide a method and apparatus that, based on a given corpus of documents, and a given collection of known annotators, identifies whether there exists an aggregate of the known annotators that is a functional equivalent to an unknown annotator.

Another object of the invention is to provide a method and apparatus for replacing a plurality of annotators in an annotation processing pipe with one, potentially more efficient, aggregate of known annotators. This object particularly relates to certain objects of TA, in that analysis application often involves a large set of annotators that form the annotation processing pipe.

A general embodiment of the invention includes a given collection of annotators and a subject annotator. The annotators in the given collection may include annotators that are non-aggregated, i.e., primitive annotators, and/or annotators that are themselves aggregates of other annotators. The subject annotator may be a known annotator, or may be an unknown annotator, but in both cases it is analyzed as a black box.

A general embodiment performs steps, or includes machine-readable instructions, for identifying whether the subject annotator is functionally equivalent to an aggregate of the given annotators and, if such a functionally equivalent aggregate is identified. If a functionally equivalent aggregate is found by the embodiment to exist, it a general embodiment performs steps, or includes machine readable instructions, for mapping the subject annotator to the identified virtual aggregate of collection's annotators.

A general embodiment identifies whether the subject annotator includes providing a corpora of original documents and providing or generating a corresponding corpora annotated documents. The original documents are selected or provided such that the corpora of annotated documents contains instances of annotations produced by all of the collection's annotators and by all of annotators' possible aggregates.

A general embodiment further includes applying the subject annotator to the corpus of original documents to produce instances of its annotations in all documents.

A general embodiment further may include sorting-out good candidate annotations, from the set of annotations produced by annotators from the given collection, and decomposing annotations produced by the subject annotator, to represent them as superpositions of the given candidate annotations, on a per document group basis.

A general embodiment further includes mapping the subject annotator to a virtual or actual aggregate of the given annotators in the selects, and the mapping may include selecting the most representative superposition of the given candidate annotations and then mapping that superposition it to a virtual or actual aggregate of the collection's given annotators.

DETAILED DESCRIPTION OF PREFERRED EMBODIMENTS

It is to be understood that the present invention is not limited to the specific examples described herein and/or depicted by the attached drawings, and that other configurations and arrangements embodying or practicing the present invention can, upon reading this description, be readily implemented by persons skilled in the arts pertaining to the invention.

In the drawings, like numerals appearing in different drawings, either of the same or different embodiments of the invention, reference functional or system blocks that are, or may be, identical or substantially identical between the different drawings.

It is to be understood that the various embodiments of the invention, although different, are not necessarily mutually exclusive. For example, a particular feature, function, act or characteristic described in one embodiment may, within the scope of the invention, be included in other embodiments.

Further, it is to be understood that the terminology used herein is not limiting and, instead, is only for purposes of ease of reference.

Further, it is to be understood that functions and operations shown or described as separate blocks are not, unless otherwise specified or clear from the context, necessarily performed at separate times, or on separate computational units, and operations described or depicted as being separate may be implemented or modeled as a single block.

Further, as will be understood by persons skilled in the art upon reading this description, certain well-known methods, arrangements, acts and operations of annotators are omitted, or are not described in detail, so as to better focus on, and avoid obscuring the novel features, combinations, and structures of the present invention.

The present invention includes various functional blocks, acts, steps and/or operations (collectively "operations"), which will be described below. The operations can be embodied in machine-executable instructions, which may be stored on a machine-readable medium, which can be used to cause a general-purpose or special-purpose processor programmed with the instructions to perform the operations.

Figure 1:
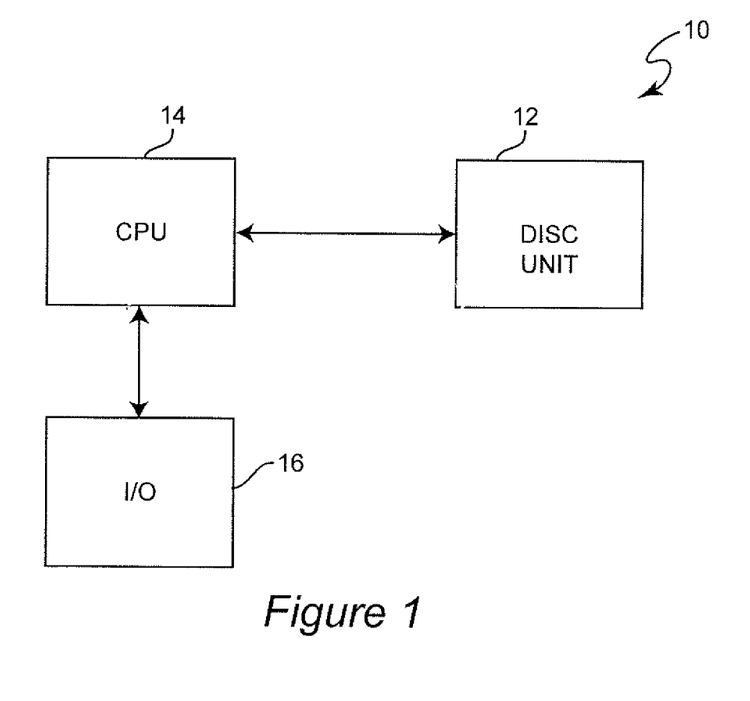
FIG. 1 illustrates an example detailed system architecture in accordance with at least one embodiment.

FIG. 1 illustrates one example of a detailed system architecture 10 in accordance with at least one embodiment, in which described operations can be embodied in machine-executable instructions stored on, for example, the disk 12 or other machine-readable medium, the instructions causing a general-purpose or special-purpose processor, such as, for example, the central the processing unit, or CPU 14 to perform the operations. The instructions may be stored on, for example, the disk 12 or another other storage medium. The described data and annotator systems, such as the corpus of documents, pre-annotated documents and annotated documents, given annotators and subject or unknown annotator described in reference to FIGS. 2-4, may be stored on, for example, the disk 12 or another machine medium. An I/O unit or system 16 such as, for example, a keyboard and/or graphical user interface or, for example, a personal computer connected via network to the CPU 14 is included in the example system 10.

Alternatively, the described operations may be performed by specific hardware components that contain hardwired logic for performing the steps, or by any combination of programmed computer components and custom hardware components. Further, the described operations may be performed in distributed computing systems or environments, such as processors and processing components remote from a machine-readable medium, where instructions from the medium are communicated over a communication link or network.

Example General Flow and System Overview

A collection of given annotators is provided. For purposes of this description, an annotator is a process, method or routine that inserts, adds or associates annotations to textual media documents. The given annotators may include primitive annotators and aggregate annotators, where primitive annotator means a species of annotator that itself carries out annotator processes methods or routines, without using other annotators and aggregate annotators, or aggregates, means a species of annotator composed of a plurality of other annotators, which themselves may be primitive and/or aggregate annotators. An aggregate is defined as a flow of annotators constituting the aggregate operation flow.

All possible aggregates of the given annotators are also provided in the collection, or are generated using, for example, conventional methods or algorithms for aggregating annotators. A corpora of original documents is provided, and a corresponding corpora of annotated documents is provided or generated. The annotated documents are the original documents annotated to contain instances of annotations produced by all of the collection's given annotators and by all aggregates of the given annotators. These instances are referenced in this description as "given annotations." The subject annotator is applied to the corpus of original documents to produce instances of its annotations in all documents. These instances are referenced in this description as "subject annotations."

A filtering may be performed, to reduce unnecessary computational burden in subsequently described operations, to sort out annotations from the given annotations using a described method of calculating their relevance, these filtered annotations being collectively referenced in this description as "good candidate annotations."

The subject annotations are decomposed into a representation that is by superpositions of the given annotations. The decomposition is in terms of certain of the given annotations, which are either those sorted out as good candidate annotations, by the optional filtering or, inherent in the decomposition, ones of the given annotations that would have been identified as good candidate annotations if the filtering were performed. The decomposition is on a per document group basis.

A mapping is performed that selects the most representative superposition of the given candidate annotations and maps that superposition to a virtual or actual aggregate of collection's annotators. This, in turn, provides automatic mapping any given annotator to a virtual or actual aggregate of the given collection's annotators.

An example overview of the decomposition of subject annotations into a representation as superpositions of the given annotations may be represented as follows:

i. Represent annotations as mapping functions from the space of documents and sentences to the space of tagged textual spans;
ii. Embed the space of equitagged spans into the vector space of appropriate dimension. With this abstraction annotation functions map the space of documents and sentences into the vector space;
iii. Define Boolean expressions on the annotation spans;
iv. Form a basis on the set of annotation expressions; and
v. Identify an expression of the untried equitagged Annotation through the given set of annotations.

Example Functional Flow

Figure 2:
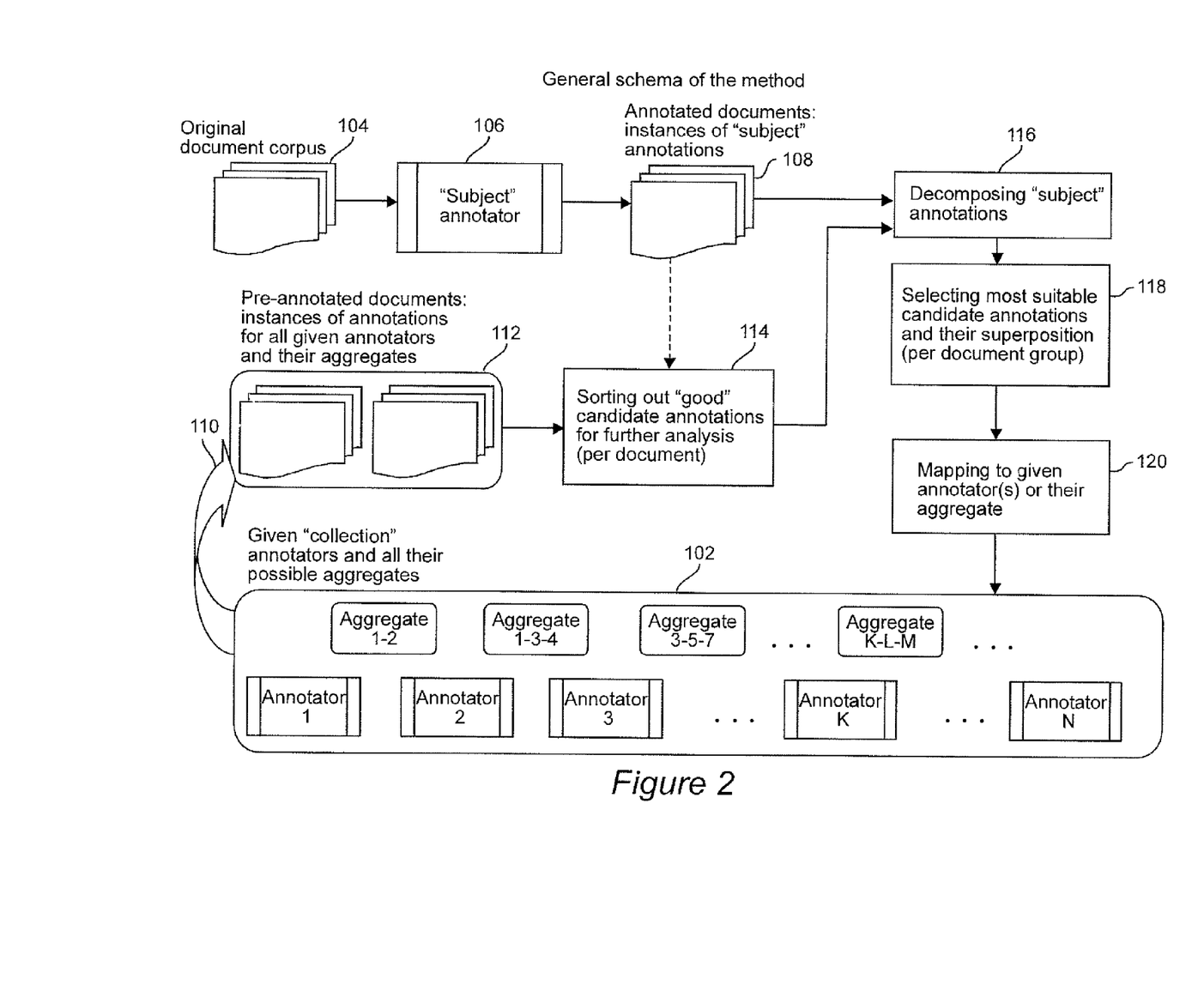
FIG. 2 illustrates an example high level flow diagram of an example annotator mapping system and method according to the present invention.

FIG. 2 illustrates an example functional flow diagram for an embodiment of the method.

At 102 a plurality of N annotators is provided, represented in FIG. 2 by the sub-blocks labeled $Annotator_n$, for n=1 to N. Also at 102, all aggregates of the annotators, $Annotator_n$ n=1 to N, are provided or generated. The aggregates are represented at 102 of FIG. 2 as $Aggregate_i$, for i=1-2 . . . 1-N, 2-1 . . . 2-N . . . K-L-M . . . The hyphenated value of the subscript i of Aggregate represents all of the $Annotator_n$ aggregated to form that $Aggregate_i$. For example, $Aggregate_{2-4-N}$ is the aggregate of the 102 given $Annotator_2$, $Annotator_4$ and $Annotator_N$, and $Aggregate_{1-4-6}$ is the aggregate of $Annotator_1$, $Annotator_4$ and $Annotator_6$.

102 may be realized by providing all of the N annotators and all of the aggregates, or by providing all of the N annotators and then generating all of the possible aggregates. As can be understood by persons of ordinary skill in the relevant arts, the above phrase "all of the possible aggregates" means all reasonable aggregates that can be created from the given annotators, where "reasonable" is associated with two general conditions: (i) an input/output condition requiring compatibility at the type system level, because annotators can be aggregated only if they have such compatibility; and (ii) a semantic condition, requiring that the annotators be such that their aggregation is meaningful.

With continuing reference to FIG. 2, at 104 an original document corpus is provided.

At 106 a subject annotator, which may be an unknown annotator, or one of the given annotators, is applied to the original document corpus 104 to generate a corpus of annotated documents 108.

At 110 each $Annotator_n$, for n=1 to N, and each $Aggregate_i$, for i=1-2 . . . 1-N, 2-1 . . . 2-N . . . K-L-M, is applied to the original document corpus to generate a corpus of pre-annotated documents 112.

At 114, which is an option that may reduce unnecessary computation burden in carrying out the decomposing 116 described below, a sorting is performed to sort out from the annotations contained in the pre-annotated documents 112 those annotations meeting a criteria for correlation, in terms of occurrences, with the subject annotations. Such annotations are referenced in this description as "good candidate annotations."

Figure 3:
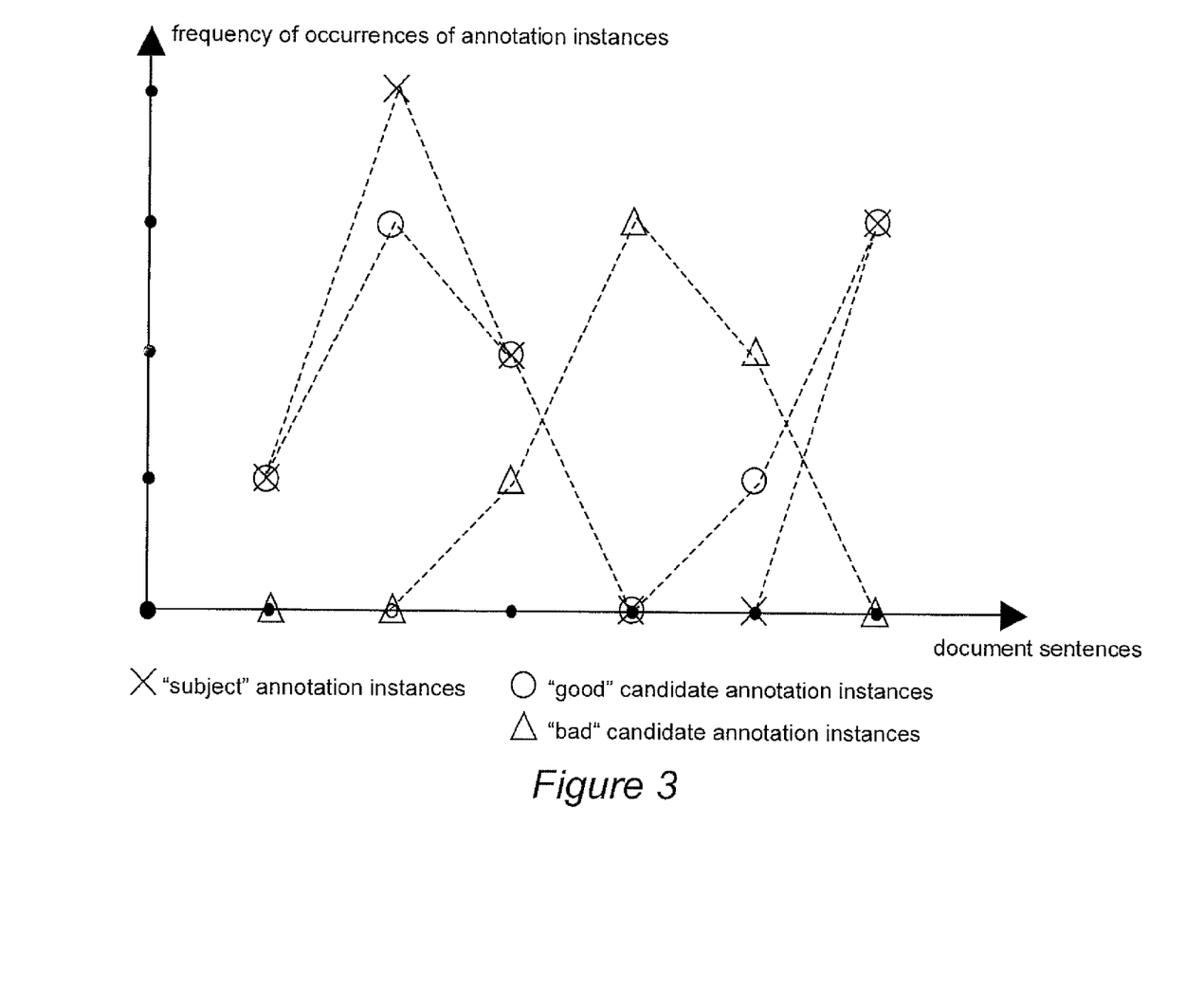
FIG. 3 illustrates, in graph representation form, an example of a selection of good candidate annotations from the given annotations in the FIG. 2 example annotator mapping system and method.

An example of the 114 filtering is illustrated in FIG. 3, as follows:
a) a graph, or information that can be described in graph form is constructed or calculated for each concrete annotation type of the given annotators, for each document in the pre-annotated documents 112, representing frequencies of the candidate annotation instances in each sentence of the document;
b) analogous frequency graphs, or frequency information that can be described in graph form as graphs, are calculated or constructed, for each document in the annotated documents 108, for the subject annotation instances; and
c) by comparing, on a per document basis, the graphs or information identified at sub-paragraph (a) above, i.e., the given candidate annotations frequency graphs, to the graphs or information identified at sub-paragraph (b) above, i.e., the subject annotations frequency graphs, filtering is obtained as to the given candidate annotations instances that have frequency graphs correlated with the frequency graphs of the subject annotations instances.

Referring again to FIG. 2, at 116 the subject annotations are decomposed into aggregates of the given annotations.

Figure 4:
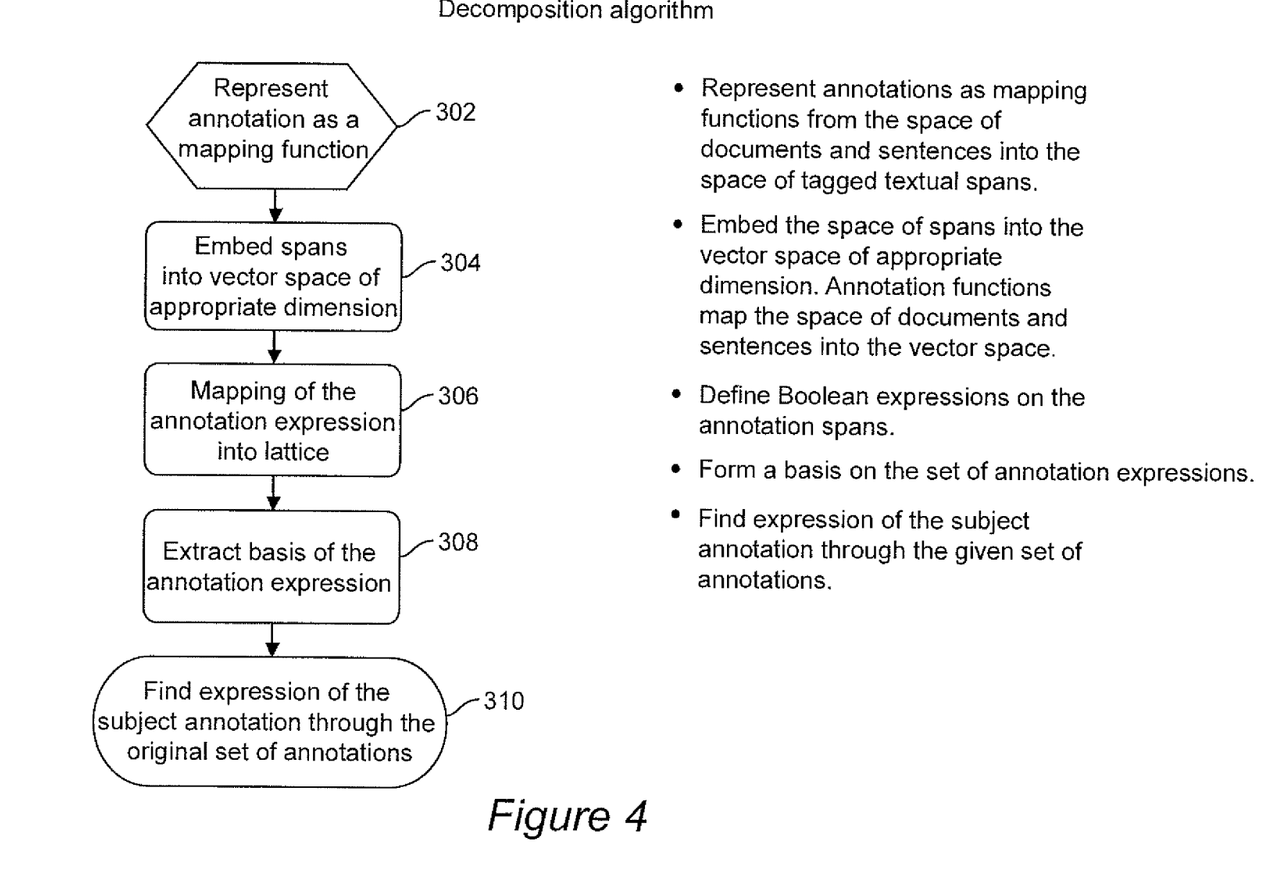
FIG. 4 illustrates an example flow diagram of a decomposition of a subject annotation into a logical expression of given annotations.

FIG. 4 illustrates an example flow diagram for the 116 decomposition. Referring to FIG. 4, at 302 the annotations are formally modeled as a mapping from a (corpus, document, sentence) space to a (span, tag) space. An example modeling identifies, as equitagged spans, the spans with the same value of the tag. The measure on the spans may be represented as follows: Span S is represented as the union of non-intersecting intervals $I_k$ from the sentence associated with the annotation. For each interval $I_k=[a_k, a_{(k+1)}]$, where $a_i$ are coordinates (positions) within the document, the measure may be defined as measure $m(I_k)$ being $|a_{(k+1)} - a_k|$, and for the span the measure may be defined as $m(S)=\Sigma m(I_k)$.

At 304 the spans are embedded into a vector space of dimension preferably greater or equal to the number of all possible spans for this sentence. For example, the sentence "The summit starts today." can have 4+6+3+1=14 spans, including non-contiguous spans.

An example of the embedding 304 is as follows:
Consider functions F from (corpus, document, sentence)$\rightarrow R^d$, where d=length_of(sentence).

Span-interval $I_k$ corresponds to the vector space generated by the coordinates $[a_k, a_{(k+1)}]$ and, with each span S defined as a union of the non-intersecting intervals $I_k$, we associate FS(S) as a function from set of all functions from (corpus, document, sentence)$\rightarrow$subspaces generated by appropriately taken coordinates of the $R^d$. Regarding the "appropriately taken coordinates," for this example embedding 304 the vector space dimension is equal to the number of characters in the sentence, which is d generated by the above-described functions F. The position of each character position this sentence may be represented by the vector d, having a logical "1" coordinate in the position corresponding to the position of the character in the sentence and logical "0" coordinates in all other positions (like '100 . . . 0' for the $1^{st}$ character, etc.) In the same way, the embedding 304 may associate each word in the sentence with a sum of vectors representing its characters. Each span may include one or more words, so the 'span' function can map the tuple (corpus, document, sentence) into subspaces of the $R^d$ that include vectors corresponding to whole words or their combinations. An example embedding 304 may fix a counting measure on (corpus, document, sentence), and define a scalar product on FS as $(FS_1, FS_2)$=Sum over all (corpus, document, sentence) of $m(S1 \cap S2)$.

Referring to the FIG. 4 example functional flow, 306 maps the annotation expression into, for example, a lattice of the possible expressions. An example 306 mapping may be as follows:
a. let annotation $A_i$ correspond to the span $S_i$;
b. define for two annotations, labeled for reference as $A_1$ and $A_2$, an intersection operation $S_0$ as the coordinate-wise union of all possible pairwise intersections of intervals defining $S_1$ and $S_2$;

c. define a union operation $S_0$ of $A_1$ and $A_2$ in a similar manner as (b). It should be noted that the union $S_0$ of $S_1$ and $S_2$ is a union of spans coordinate wise;

d. define in a similar manner a complement of $S_1$ and inclusion $S_2$ in $S_1$;

e. define, as possible Boolean expressions corresponding spans, coordinate-wise, the set of all possible expressions of the annotations $A_i$; and f. form the set of all possible expressions, referenced hereinafter as APE, on the annotations $A_i$ as a lattice LA with respect to union, intersection, inclusion and complement.

It will be understood that the above-listed example outline for carrying out the example mapping 306 to a lattice is only for purposes of presenting an example logical representation, and is not necessarily a representation of a sequence, grouping or modules of operations or machine-readable code for the mapping.

With continuing reference to FIG. 4, 308 extracts a basis on the set of all possible expressions (APE). The basis may not be unique, but the described system and method, and the processing results, do not depend on the specific extracted or chosen basis. An example 308 extraction chooses as the basis on the set of all possible expressions (APE) the minimal set of elements from inclusion APE (IAPE), in the sense that no element is less than a given element with respect to inclusion, so that each expression E from APE may be represented as a union of elements from IAPE. A minimal set of elements is the smallest possible result, which is the intersection of all annotations. This may be an empty set. Identifying the basis may be, for example, generally along the flow of Gauss elimination for linear matrices. For example, extraction 308 may iteratively remove indices, one at a time, and create an intersection for them. The iterations may be in accordance with, or carried out applying the following logic:

i) The removed index may be empty, or it may be the first index for which all possible further intersections will be empty. If it is the first such index then it is a minimal set and it is chosen.

ii) If the removed index is not the first non-empty index, then the difference between this set and all possible chosen minimal sets may be considered, and a complementary minimal set may be chosen based on this difference.

It will be understood that the above-listed example outline for carrying out the example extraction 308 is for only for purposes of presenting an example logical representation, and is not necessarily a representation of a sequence, grouping or modules of operations or machine-readable code for the extraction.

By the above example construction in the extraction 308, every expression E on APE can be represented as a union of the minimal or complementary minimal sets. Accordingly, if some E on APE cannot be represented as a union of minimal or complimentary minimal sets then it is not acceptable.

Referring to the FIG. 4 example flow diagram for the FIG. 2 decomposition 116, at 310 the expression of the subject equitagged Annotation is found in terms of the annotations in the pre-annotated documents 112 that were inserted by the given annotators and aggregates 102. An example expression 310 may be as follows:

a. Find the basis of the given set of annotation expressions;

b. Express the subject annotation as an expression on the basis; and c. Substitute each element of the basis in the expression of the subject annotation, inserted by the subject annotator at 106 and extant in the annotated documents 108, through the basis with its expression through annotations inserted by the 102 annotators.

It will be understood that the above-listed example outline for carrying out the example expression 308 is only for purposes of presenting an example expression through the basis, and is not necessarily a representation of a sequence, grouping or modules of operations or machine-readable code for the expression.

Referring again to the FIG. 2 example flow diagram, after the decomposing 116, at 118 the most suitable expression of the subject annotation (which is an expression on the basis) is identified on a per document basis. Most suitable are those expressions that proved to be the most common, i.e., have the highest frequencies of occurrence, on the given group/corpus of documents.

At 120 that identified expression is mapped to the virtual or actual aggregate of the given annotators 102, where "virtual aggregate" means an aggregate that does not exist in the collection of given annotators $Annotator_n$, but that may be created if needed, and an "actual aggregate" one the one that already exists in the collection of given annotators 102.

An example of carrying out the above-described method, or system if performed on a machine reading machine-readable instruction, is as follows:

Given: two given annotations, which we will labeled for reference as A1 (Official_Title) and A2 (Person_Name), in the pre-annotated documents 112, and a subject annotation, which will be labeled for reference as A3. Also given: the following example original text, appearing in a document in the original document corpus 104:

The deal appeared to be a clear victory for Sen. John Smith, Named Political Party, Somestate, who sponsored the proposed bill, and a setback for Sen. Bill Murray and others who had argued that the bill would impede United States security efforts.

The above example original text, in the pre-annotated documents 112 annotated by the annotators in 102 that implement A1 and A2, is as follows:

The deal appeared to be a clear victory for <annot type="Official_Title">Sen.</annot><annottype="Person_Name">John Smith</annot>, Named Political Party-Somestate, who sponsored the proposed bill, and a setback for <annot type="Official_Title">Vice President</annot> <annot type="Person_Name">Bill Murray</annot> and others who had argued that the proposed bill would impede United States security efforts.

The same text, in the annotated documents 108 annotated by the subject annotator 106 that implements unknown annotation A3:

The deal appeared to be a clear victory for <annot type="AT3">Sen. John Smith </annot>, Named Political Party-Somestate, who sponsored the proposed bill, and a setback for <annot type="AT3">Vice President Bill Murray </annot> and others who had argued that the proposed bill would impede United States security efforts.

Decomposing A3 by A1 and A2, applying the decomposing 116 in accordance with, for example, the FIG. 4 example flow diagram, we get the following expression:

$$A3 = A1 \text{ union } A2$$

Applying the described system and method, users can identify that already known or accessible annotators, i.e., an "annotator library," (see, for instance, UIMA Component Repository at http://uima.lti.cs.cmu.edu:8080/UCR/Welcome.do) that if, combined in an appropriate way to form an aggregate annotator, may meet desired objectives.

As described, this method and system automatically map a given subject annotator 106 to a virtual or actual aggregate of the given annotators 102. Applying the described system and method, a SAIL or other generated annotator may be identified as functionally equivalent to, i.e., produce the same annotations as, a combination of library annotators. Accordingly, using the described system and method a rule based annotator, generated by for example the SAIL or equivalent system, for a particular document collection, may be replaced with a functionally equivalent aggregate of already existing library annotators that is generated by the present system and method, thus significantly improving the overall performance of the TA application.

This in turn, may allow substituting several adjacent annotators in the given annotation processing pipe with one, possibly more efficient, functionally equivalent annotator from the given collection. Such a substitution may be possible after mapping a selected group of annotators from the given processing pipe to one of existing annotators from the given collection.

Further, the described system and method provide for selecting a suitable mapping for any group of adjacent annotators from the given annotation processing pipe. In addition, the method and system may be applied to extend methods of automated planning to a set of annotators that include both well-known and untried ones. Automated planning is known in the relevant art, see, for example, "Stream Processing Planning", G. Grabarnik, Z. Liu, A. Riabov, ICAPS 2005, and "Automated planning in the Grid stream processing environment", G. Grabarnik, L. Shwartz, Applied Computing, 2006, so further description is unnecessary for applying the described system and method. Further, the system and method may assist or provide reduction in the dimensionality of planning problems, such as for example, the type described in "Algorithm Overview" section of "Automated planning in the Grid stream processing environment", G. Grabarnik, L. Shwartz, Applied Computing, 2006, p. 4, and similar publications.

While certain embodiments and features of the invention have been illustrated and described herein, many modifications, substitutions, changes, and equivalents will occur to those of ordinary skill in the art. It is therefore to be understood that the appended claims are intended to cover all such modifications and changes as fall within the spirit of the invention.

We hereby claim:

1. A computer implemented method of automatically mapping a given annotator to an aggregate of given annotators, comprising:
    providing, with one or more processors, a plurality of annotators stored on a machine-readable storage medium;
    providing, with the one or more processors, aggregates of the plurality of annotators;
    providing, with the one or more processors, an original document corpus stored on a machine-readable storage medium;
    applying, with the one or more processors, a subject annotator to the original document corpus to generate a corpus of subject annotated documents stored on a machine-readable storage medium;
    generating, with the one or more processors, a corpus of pre-annotated documents that contain annotations, the corpus of pre-annotated documents that contain annotations being stored on a machine-readable readable storage medium;
    sorting, with the one or more processors, the annotations contained in the corpus of pre-annotated documents, to generate good candidate annotations, the step of sorting comprising
        i) for each document in the corpus of pre-annotated documents, constructing within a graphical user interface a graph representing frequencies of instances of candidate annotations in each sentence,
        ii) for each document in the corpus of subject annotated documents, constructing within the graphical user interface an analogous graph superimposed on the graph from (i), wherein the analogous graph represents frequencies of instances of subject annotations, and
        iii) providing a visual comparison within the graphical user interface, on a per document basis, to the graph from (i) and the analogous graph from (ii) to identify the instances of the candidate annotations with correlation to the instances of the subject annotations;
    the method further comprises a decomposing step that comprises:
        modeling annotation expressions as a mapping from a corpus, document, sentence space to a span, tag space, wherein the modeling identifies, as equitagged spans, spans with a same value of a tag, a measure on the spans being represented as follows:
        Span S is represented as a union of non-intersecting intervals $I_k$ from a sentence associated with an annotation, and for each interval $I_k=[a_k, a_{(k+1)}]$, where $a_i$ are coordinates (positions) within the document, the measure is defined as measure $m(I_k)$ being $|a_{(k+1)}-a_k|$, and for the span the measure is defined as $m(S)=\Sigma m(I_k)$;
        embedding the spans into a vector space of dimension greater or equal to a number of all possible spans for a sentence;
        mapping an annotation expression into a lattice of the possible expressions;
        extracting a basis on a set of all possible expressions (APE) by choosing as the basis on the set of all possible expressions (APE) a minimal set of elements from inclusion APE (IAPE), so that each expression E from APE may be represented as a union of elements from IAPE; and
        finding an expression of a subject equitagged Annotation in terms of the annotations in the corpus of pre-annotated documents that were inserted by said plurality of annotators and said aggregates of said plurality of annotators; and
    mapping, with the one or more processors, the subject annotator, the subject annotator being stored on a machine-readable storage medium.

2. The method of claim 1, further comprising:
    identifying, using a computer or hardware component, a suitable expression of the subject annotation on a per document basis.

3. The method of claim 2, further comprising:
    mapping an identified suitable expression to an aggregate of said plurality of annotators.

4. The method of claim 1, further comprising: based on the good candidate annotations, decomposing the corpus of subject annotated documents into aggregates of the good candidate annotations.

5. The computer implemented method of claim 1, wherein the step of providing aggregates comprises providing aggregates that can be created based on conditions including:
  (i) an input/output condition requiring compatibility at the type system level, because annotators can be aggregated only if they have such compatibility; and
  (ii) a semantic condition, requiring that the annotators be such that their aggregation is meaningful.

6. The computer implemented method of claim 1, wherein the subject annotator is an unknown annotator.

7. The computer implemented method of claim 1, wherein the subject annotator is one of the plurality of annotators.

8. The computer implemented method of claim 1, wherein the step of mapping is performed to a virtual or actual aggregate of said plurality of annotators, where "virtual aggregate" means an aggregate that does not exist in the collection of said plurality of annotators but that may be created if needed, and an "actual aggregate" is one that already exists in the collection of said plurality of annotators.

9. A computer program product for automatically mapping a given annotator to an aggregate of given annotators, the computer program product comprising a non-transitory computer readable storage medium having program instructions embodied therewith, the program instructions executable by one or more processors to cause the one or more processors to perform a method comprising:
  providing a plurality of annotators;
  providing aggregates of the plurality of annotators;
  providing an original document corpus;
  applying a subject annotator to the original document corpus to generate a corpus of subject annotated documents;
  generating a corpus of pre-annotated documents that contain annotations;
  sorting the annotations contained in the corpus of pre-annotated documents, to generate good candidate annotations, the sorting comprising
    i) for each document in the corpus of pre-annotated documents, constructing within a graphical user interface a graph representing frequencies of instances of candidate annotations in each sentence,
    ii) for each document in the corpus of subject annotated documents, constructing within the graphical user interface an analogous graph superimposed on the graph from (i), wherein the analogous graph represents frequencies of instances of subject annotations, and
    iii) providing a visual comparison within the graphical user interface, on a per document basis, to the graph from (i) and the analogous graph from (ii) to identify the instances of the candidate annotations with correlation to the instances of the subject annotations;
  the method further comprises a decomposing step that comprises:
  modeling annotation expressions as a mapping from a corpus, document, sentence space to a span, tag space, wherein the modeling identifies, as equitagged spans, spans with a same value of a tag, a measure on the spans being represented as follows:
  Span S is represented as a union of non-intersecting intervals $I_k$ from a sentence associated with an annotation, and for each interval $I_k=[a_k, a_{(k+1)}]$, where $a_i$ are coordinates (positions) within the document, the measure is defined as measure $m(I_k)$ being $|a_{(k+1)} - a_k|$, and for the span the measure is defined $m(S) = \Sigma m(I_k)$;
  embedding the spans into a vector space of dimension greater or equal to a number of all possible spans for a sentence;
  mapping an annotation expression into a lattice of the possible expressions;
  extracting a basis on a set of all possible expressions (APE) by choosing as the basis on the set of all possible expressions (APE) a minimal set of elements from inclusion APE (IAPE), so that each expression E from APE may be represented as a union of elements from IAPE; and
  finding an expression of a subject equitagged Annotation in terms of the annotations in the corpus of pre-annotated documents that were inserted by said plurality of annotators and said aggregates of said plurality of annotators; and mapping the subject annotator.

* * * * *